United States Patent
Wang et al.

(10) Patent No.: US 7,080,147 B2
(45) Date of Patent: Jul. 18, 2006

(54) COMPUTER NETWORK SYSTEM, COMPUTER SYSTEM, METHOD FOR COMMUNICATION BETWEEN COMPUTER SYSTEMS, METHOD FOR MEASURING COMPUTER SYSTEM PERFORMANCE, AND STORAGE MEDIUM

(75) Inventors: Xiaozhou Wang, Kanagawa-ken (JP); Mikito Hirota, Kanagawa-ken (JP); Kazuhiro Yabuta, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 09/952,936

(22) Filed: Sep. 12, 2001

(65) Prior Publication Data

US 2003/0051036 A1    Mar. 13, 2003

(51) Int. Cl.
*G06F 9/455* (2006.01)
*G06F 15/173* (2006.01)

(52) U.S. Cl. .................. 709/227; 717/134; 703/22

(58) Field of Classification Search ............... 709/203, 709/218, 224, 227–229, 245, 246; 703/22; 717/134–135
See application file for complete search history.

(56) References Cited

U.S. PATENT DOCUMENTS

| | | | |
|---|---|---|---|
| 5,931,917 A * | 8/1999 | Nguyen et al. ............. | 709/250 |
| 6,115,754 A * | 9/2000 | Landgren .................... | 709/249 |
| 6,263,437 B1 * | 7/2001 | Liao et al. ................... | 713/169 |
| 6,347,340 B1 * | 2/2002 | Coelho et al. .............. | 709/246 |
| 6,446,120 B1 * | 9/2002 | Dantressangle ............. | 709/224 |
| 6,473,802 B1 * | 10/2002 | Masters ...................... | 709/229 |
| 6,601,098 B1 * | 7/2003 | Case et al. .................. | 709/224 |
| 6,606,663 B1 * | 8/2003 | Liao et al. ................... | 709/229 |
| 6,778,654 B1 * | 8/2004 | Takatori et al. ........ | 379/212.01 |
| 6,789,170 B1 * | 9/2004 | Jacobs et al. ............... | 711/133 |
| 2002/0007317 A1 * | 1/2002 | Callaghan et al. ............ | 705/26 |
| 2002/0029175 A1 * | 3/2002 | Yabuta et al. ................. | 705/27 |
| 2003/0140145 A1 * | 7/2003 | Lindberg et al. ............ | 709/227 |

FOREIGN PATENT DOCUMENTS

| | | |
|---|---|---|
| JP | 9073425 | 3/1997 |
| JP | 003334 A | 1/2000 |
| WO | 9963416 | 12/1999 |
| WO | 9964967 | 12/1999 |
| WO | 0048110 | 8/2000 |

* cited by examiner

*Primary Examiner*—Dung C. Dinh
(74) *Attorney, Agent, or Firm*—Jerry W. Herndon, Esq.; Steven M. Greenberg, Esq.; Christopher & Weisberg, P.A.

(57) ABSTRACT

To provide a technique for connection from a conventional personal computer having no terminal ID to a service site for mobile phone terminals. A simulation server 4 is set as the proxy server for a personal computer 5 or 9. In the proxy server (simulation server 4), terminal ID's suitable for the format are generated, and a cookie is generated for each personal computer or session. The terminal ID's and cookies are related and stored as a hash table 10. In the proxy server 4, a terminal ID is appended to a request from the personal computer 5 or 9, and the request is transferred to an i-mode server 3 along with the terminal ID.

18 Claims, 6 Drawing Sheets

[Figure 1]
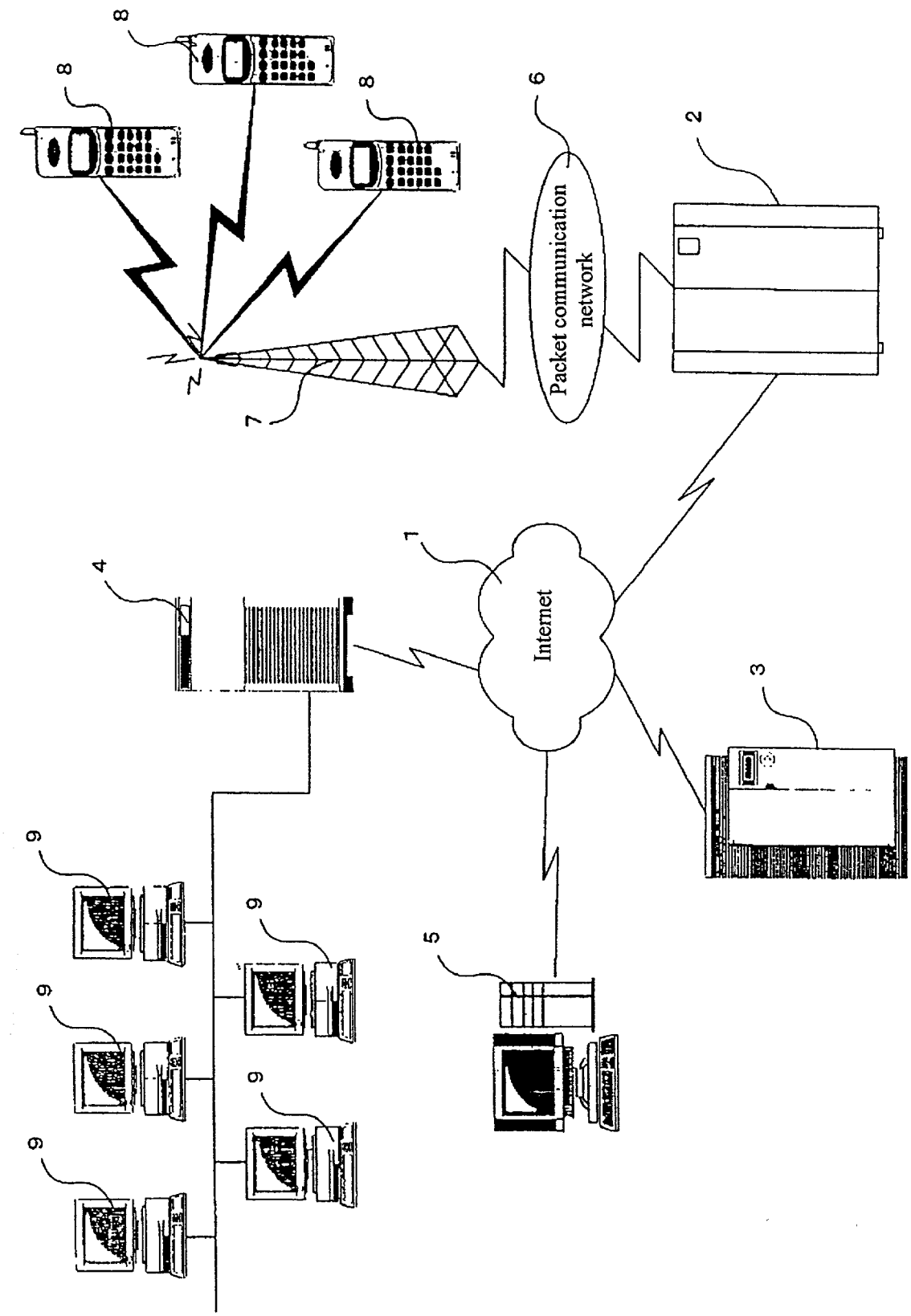

[Figure 2]
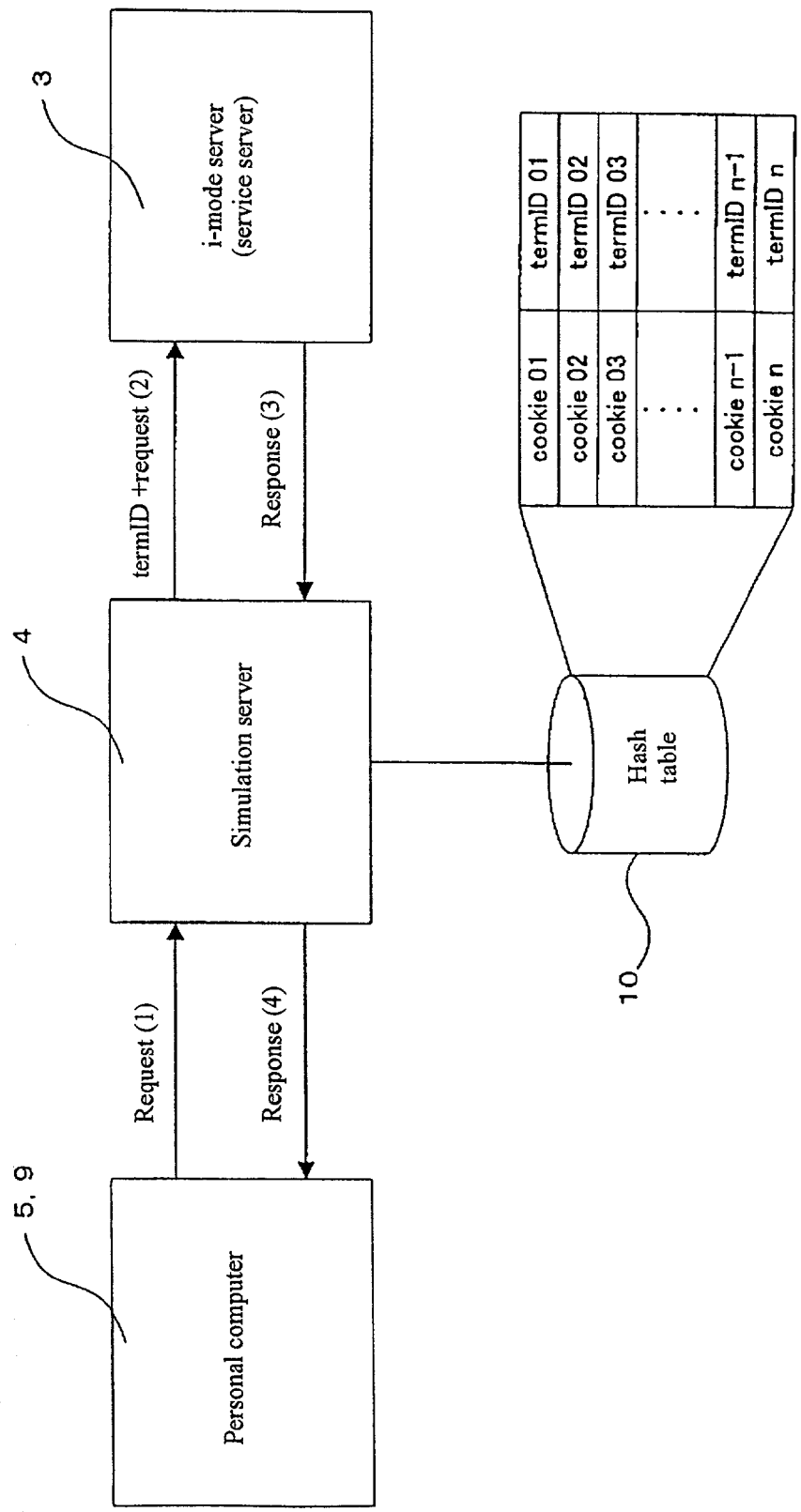

[Figure 3]
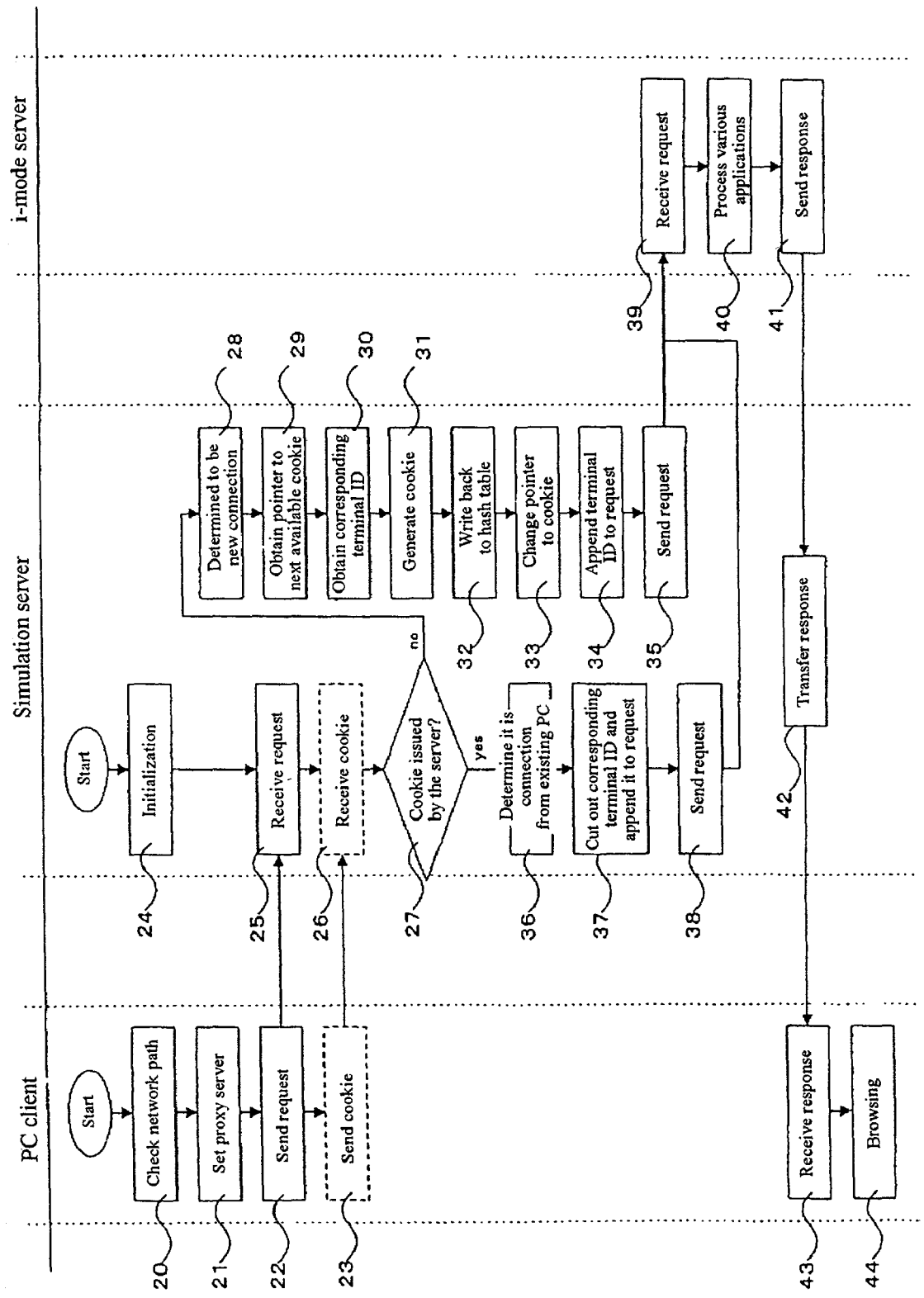

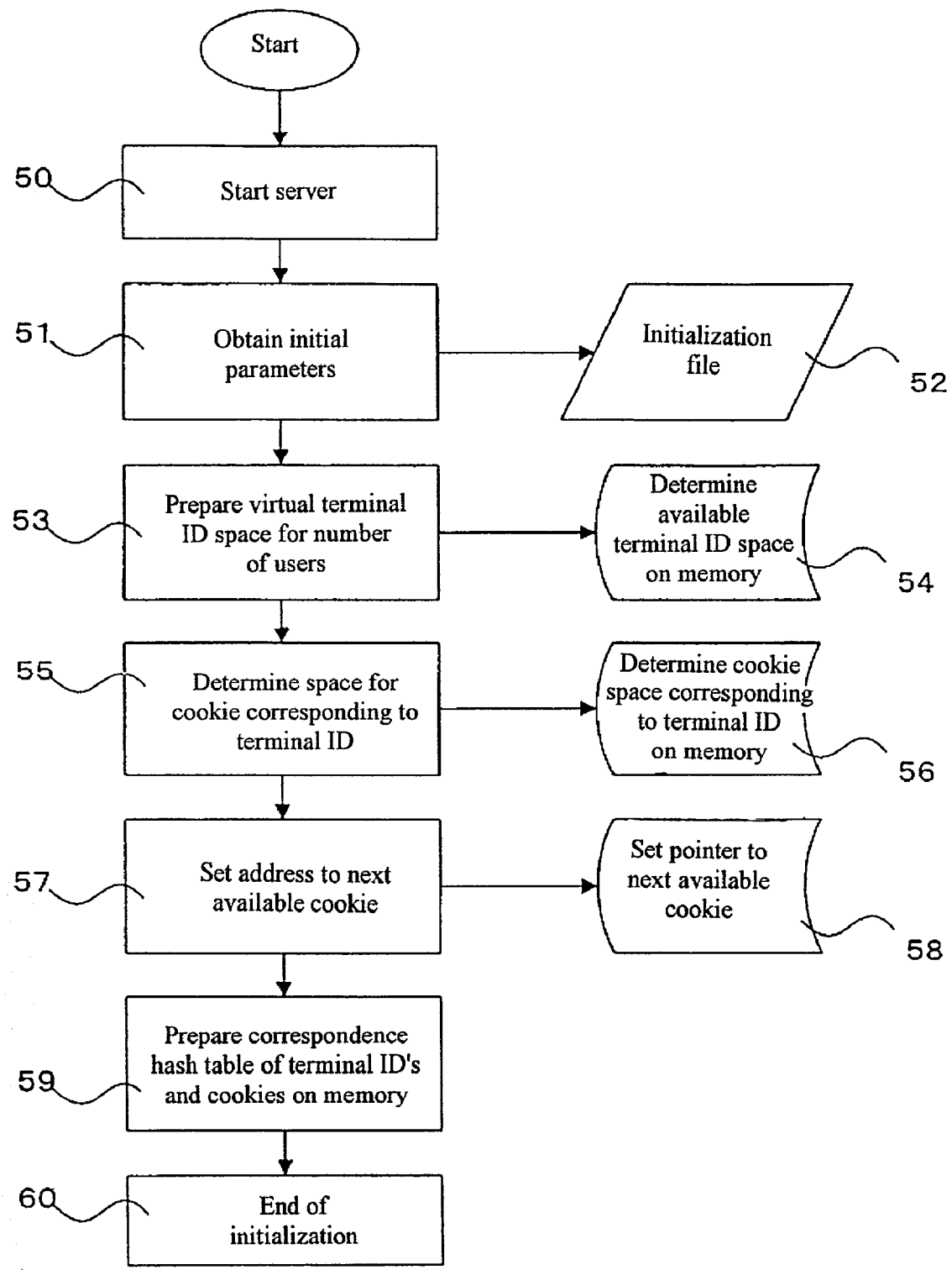
[Figure 4]

[Figure 5]
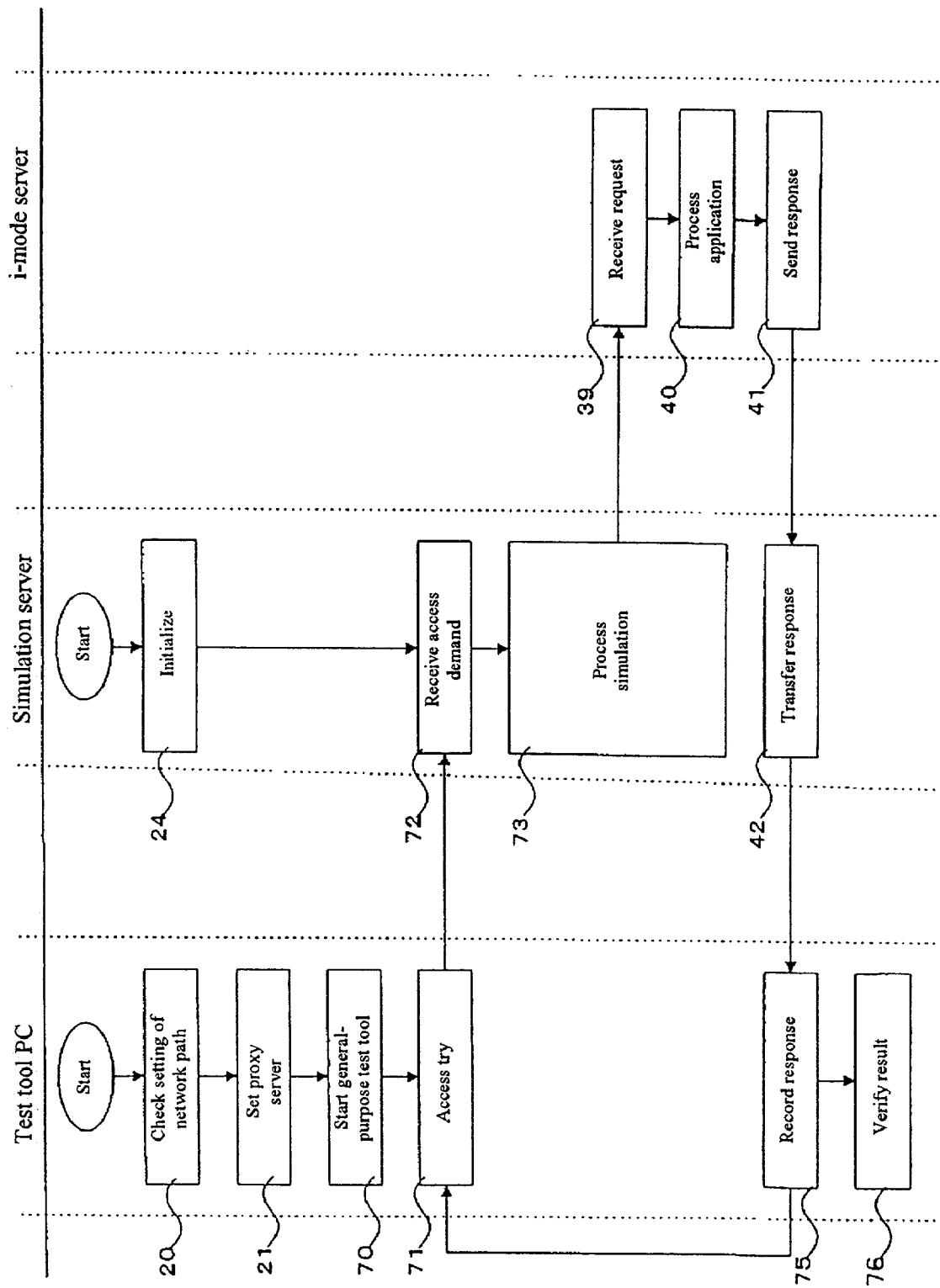

[Figure 6]
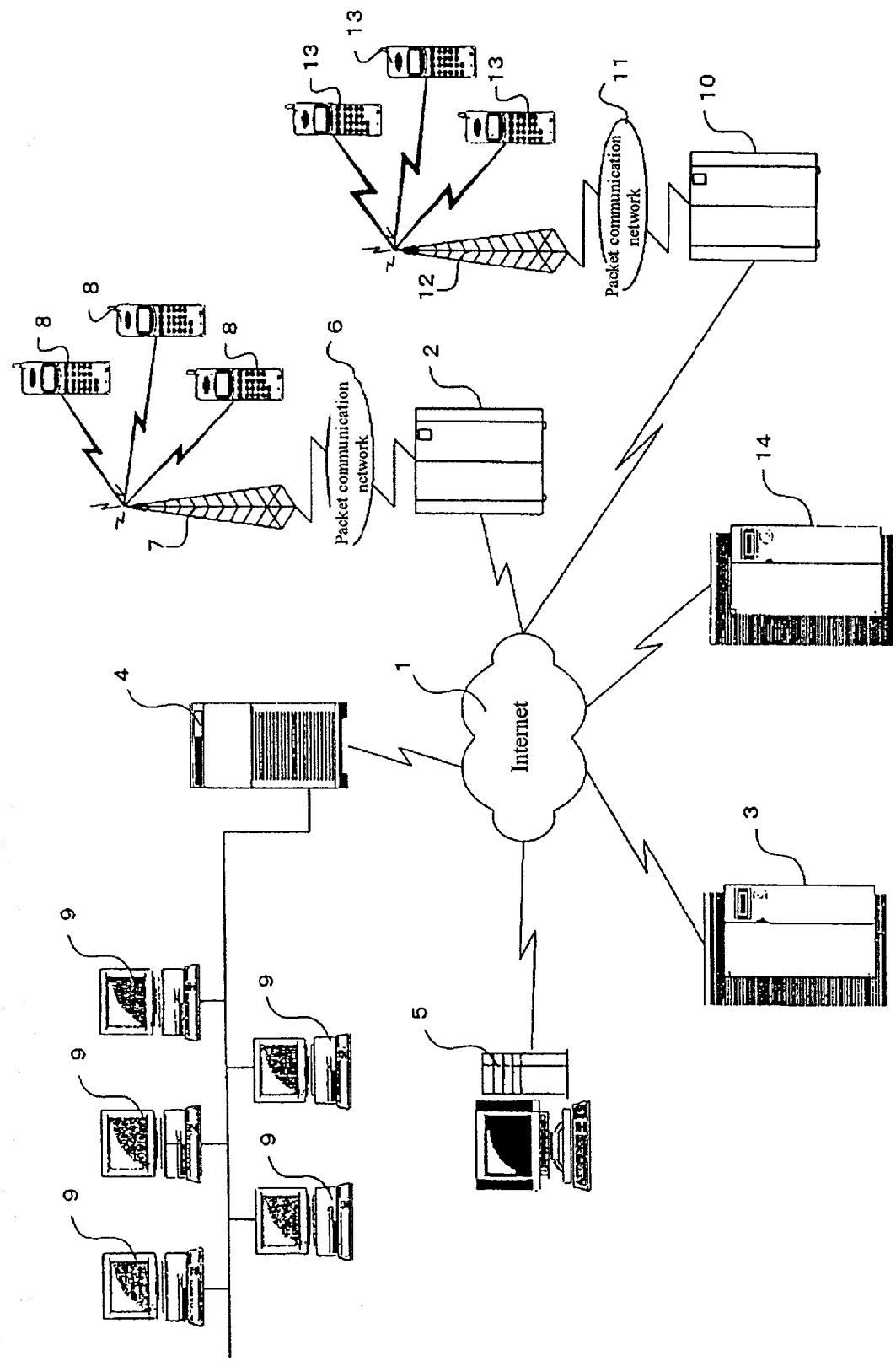

COMPUTER NETWORK SYSTEM, COMPUTER SYSTEM, METHOD FOR COMMUNICATION BETWEEN COMPUTER SYSTEMS, METHOD FOR MEASURING COMPUTER SYSTEM PERFORMANCE, AND STORAGE MEDIUM

DETAILED DESCRIPTION OF THE INVENTION

Field of the Invention

The present invention is related to a computer network system, a computer system, a method for communication between computer systems, and a method for measuring computer system performance. In particular, it is effectively applied to a technique for enabling the access from a conventional personal computer to a website that serves a request sent from a mobile phone terminal or the like along with a terminal ID.

BACKGROUND ART

The diversification of network technology has enabled the access from a mobile phone terminal, for instance, i-mode cellphones, to the Internet. I-mode is a mobile internet service originating in Japan that is becoming a major factor in mobile internet service world-wide. The markup language used for i-mode is Compact HTML (cHTML) rather than the WML used for WAP (wireless application protocol). An i-mode mobile terminal, after being connected to a packet communication network run by a carrier, can be connected to the Internet through a gateway called an i-mode center.

In the gateway, an Internet protocol is converted to a protocol used in the packet communication network. For instance, for the i-mode center gateway, TCP/IP (Transmission Control Protocol/Internet Protocol) and PDC (Personal Digital Cellular) protocol/TLP (Transport Protocol) are converted to each other, and HTTP (Hypertext Transfer Protocol) and ALP (Application Layer Protocol) are converted to each other.

The gateway allows a website to respond to a request from a mobile phone terminal, and various services can be provided to the mobile phone terminal from a website.

Compact HTML, a subset of HTML (Hypertext Markup Language), is used in a browser installed in a mobile phone terminal, for instance, an i-mode terminal,. Thus, if a website compatible with compact HTML is connected to the Internet, a server for the i-mode mobile phone terminal can be constructed.

Some browsers designed for mobile phone terminal operation do not support cookies as is done in ordinary browsers such as Internet Explorer (trademark) and Netscape Navigator (trademark) running on conventional personal computers. In these situations, a terminal ID assigned by the above gateway is used to identify a client. The terminal ID is used not only for billing purposes, but also to identify a user at the server side. For instance, a user can be identified by the terminal ID attached to a request and the service level can be optimized according to the user. In a site registered by a carrier (generally called an official site), a system is often constructed based on the premise that such terminal ID is sent.

Problems to be Solved by the Invention

As described above, servers for mobile phone terminals are often constructed based on the existence of terminal ID's. This causes the following problems.

A general-purpose Web performance tool cannot be used to measure the performance of a contents server. The general-purpose Web performance tool runs on a conventional personal computer, so access must be made from the personal computer to the server for mobile terminals. However, the access from the personal computer is not made to the server through the gateway of the carrier, but through the Internet. For example, in FIG. 1, computer 5 accesses the i-mode server 3 via the internet 1 without going through the i-mode gateway 2, whereas acceses to the server from mobile terminals 8 are made via the gateway where the terminal Ids are assigned. Thus, no terminal ID is given to a request from the computer client, and the server for mobile terminals does not accept the access because of the absence of terminal ID. Accordingly, the Web performance of the server cannot be verified using a general-purpose tool.

The method for measuring server performance includes the one in which many mobile phone terminals are used to actually access the server for mobile terminals. However, this method limits the number of mobile terminals which can simultaneously make an access. It is impossible to perform a practical bulk stress test (a test to verify whether a predetermined response can be made in the server system) if simultaneous accesses are received.

Further, no access can be made to the server for mobile terminals from a personal computer having no terminal ID. This is true not only in the measurement of system performance, but also when it is desired to receive normal service from the mobile server to requests received over the internet from personal computers.

If access can be permitted from both mobile phone terminals and personal computers, it is possible to construct a service site very convenient for users, which has both characteristics of the real time and mobility of the mobile terminal and the usability of the personal computer.

It is an object of the present invention to provide a technique for connection to a service site for mobile phone terminals from a conventional personal computer having no terminal ID.

Further, it is an object of the present invention to provide a technique for enabling an effective bulk stress test for a service site for mobile phone terminals to be performed using a general-purpose Web performance tool.

Further, it is an object of the present invention to provide a technique for enabling the easy construction of service sites for mobile phone terminals and ordinary personal computers.

SUMMARY OF THE INVENTION

The invention of this application is outlined as follows. In the system or method of the present invention, a proxy server (second computer system) is set for a personal computer (third computer system) making an access to a service site (first computer system) for mobile phone terminals. A request is issued from the personal computer to the service site through the proxy server. In this specification, a personal computer system is shown as the third computer system by way of example, but this is no restriction. All the information processing apparatus having no terminal ID provided by a carrier and capable of accessing a website are included. Further, a proxy server is shown as the second computer system by way of example, but this is no restriction. All the information processing terminals are included as long as they have a function allowing the management of the correspondence between terminal ID and session control identifier as described below.

The proxy server generates a terminal identifier suitable for the format of the terminal ID assumed by the service site for mobile phone terminals, and it generates a cookie (session control identifier) for the client personal computer, and it stores the terminal identifier in relation to the cookie. In the proxy server, the terminal ID related to its cookie is appended to a request from the personal computer, and the request is transferred to the service site along with the terminal ID. A cookie is given here as session control identifier by way of example, but this is no restriction. Any mechanism that can store session control information and be passed along with a request from a computer to a server can be used for this purpose.

Since the proxy server appends a terminal ID to the request from a personal computer, the service site can execute a predetermined service using the terminal ID. The response, a result of the execution of the service, is sent back to the client personal computer through the proxy server.

The responses to these series of service demands (requests) are managed by the terminal ID and the cookie (session control identifier). When a communication session continues, the relation of the terminal ID and the cookie is uniquely and statically maintained. That is, the proxy server (second computer system) of the present invention has a correspondence table of terminal Ids and cookies, and uniquely and statically relates them to bridge the communication process between the client and the proxy server and the communication process between the proxy server and the service site. Here, "uniquely" means one-to-one correspondence, and "statically" means that no change is made halfway.

Such system or method allows the access from a conventional personal computer to a service site for mobile terminals. By this, the performance of a service site can be verified using a general-purpose tool, and the construction, verification, and test of the service site can also be automated. Further, the access from a conventional personal computer system is allowed not only during testing, but also during normal use (service providing), and the user can seamlessly access the server from a mobile phone terminal or from a personal computer system using an ordinary browser. Further, the operator of a service site can seamlessly provide the service for personal computer systems without changing the system.

Further, in accordance with the system or method of the present invention, the cookie from a personal computer is obtained at the proxy server in response to an access from the personal computer system (third computer system). If there is no cookie, then, the connection is determined to be a new one for which a terminal identifier has not been assigned. A terminal identifier is assigned to this new session by selecting a terminal ID (second terminal identifier) from a previously generated terminal ID space, generating a cookie containing the selected terminal ID, and storing the terminal ID and the cookie in relation to each other. Thereafter the session is controlled by referring to the correspondence between the terminal ID and the cookie. Since the generated cookie is stored in the computer system of the client, the assigned terminal Id is used in successive connections on this session. The terminal ID can also be stored directly in the cookie as well as in storage of the proxy server. The terminal ID in the cookie can be cut out and appended to the request, and the request with the terminal ID can be sent to the service site. To the request, the cookie can be further appended in addition to the terminal ID.

ADVANTAGES OF THE INVENTION

Of the inventions disclosed in this application, the advantages obtained by the representative one are as follows. That is, connection can be made to a service site intended for mobile phone terminals from a conventional personal computer having no terminal ID. Further, an effective bulk stress test using a general-purpose Web performance tool can be performed for a service site intended for mobile phone terminals. Furthermore, service sites for mobile phone terminals and conventional personal computers can easily be constructed.

BRIEF DESCRIPTION OF THE DRAWINGS

FIG. 1 is a conceptual view showing an example of the computer network system that is an embodiment of the present invention;

FIG. 2 is a block diagram showing the relation among the personal computer, proxy server (simulation server), and i-mode Web server;

FIG. 3 is a flowchart for explaining an example of the method for communication between computer systems that is an embodiment of the present invention;

FIG. 4 is a flowchart showing an example of the initialization of the proxy server;

FIG. 5 is a flowchart showing an example of the method for measuring computer system performance that is another embodiment of the present invention; and FIG. 6 is a conceptual view showing another example of the computer network system that is an embodiment of the present invention.

PREFERRED EMBODIMENT

Now, the embodiments of the present invention are described in detail with respect to the accompanying drawings. However, the present invention can be practiced in many different forms, and it should not be limited to the contents described in the embodiments. The same numbers are assigned to the same elements throughout the embodiments.

Although, in the following embodiments, description is made mainly to a method or system, the present invention can be practiced not only as a method or system, but also as a medium having recorded thereon a program which can be used in a computer. Accordingly, the present invention can take a form as hardware, a form as software, or a form of combination of software and hardware. As the medium on which a program is recorded, any computer-readable medium including a hard disk, CD-ROM, optical storage device, or magnetic storage device can be given by way of example.

DETAILED DESCRIPTION

FIG. 1 is a concept view showing an example of a computer network system in which the invention can be practiced. In this embodiment, the "i-mode service" provided by a carrier is given by way of example as an Internet service provided by a carrier such as a mobile telephone company, but this is no restriction. For instance, the present invention may apply to a service such as "J-sky" provided by the J-phone group or "EZ web" provided by the DDI group. Further, it is to be understood that the present invention may apply to similar services expected to be provided in the future. In addition, the invention can be provided not only to mobile phone terminals but also to services provided using unique terminal ID. An example is described below, in which the present invention is applied to the i-mode service provided by NTT Docomo.

The computer network system of this embodiment includes the Internet 1, a gateway (i-mode center) 2 connected to the Internet 1, a Web server 3, a proxy server 4, and a personal computer (PC) 5. To the gateway 2 of the carrier, i-mode terminals 8 are connected through a packet communication network 6 and a radio base station 7. Further, to the proxy server 4, personal computers 9 are connected through a LAN (Local Area Network).

The Internet 1 is a network which applies each of TCP (Transmission Control Protocol) or UDP (User Datagram Protocol) and IP (Internet Protocol) to the transport layer or the network layer to carry out communication between computer systems. Each equipment connected is identified by a URL (Uniform Resource Locator) or IP address. The Internet 1 also includes the intranet ? the use of which is limited to specific users. The connection (of the intranet) to the Internet 1 is made by obtaining an IP address, or it may be made through an ISP (Internet Service Provider), for instance, by using PPP (Point to Point Protocol). The physical connection is made wirelessly, or by using a wire leased line or public circuit.

The gateway 2, packet communication network 6, and radio base station 7 are managed and operated by a carrier (telephone company). The radio base station 7 relays received radio waves sent from an i-mode terminal 8, and connects the i-mode terminal 8 to the packet communication network 6. The packet communication network 6 controls the voice communication and data communication between i-mode terminals 8, and also controls the communication from the i-mode terminal 8 to the Internet 1. Further, the packet communication network 6 manages and controls communication to communication networks managed by other telephone companies.

The gateway 2 is a computer system that connects the packet communication network 6 and the Internet 1 to each other. The gateway 2 has a function that mutually converts the protocols (PDC-P, TLP, ALP) used in the packet communication network 6 and a protocol (IP, TCP, or UDP, HTTP) used in the Internet 1 for each layer of the communications stack, such as the transport layer. Further, the gateway 2 issues a unique terminal ID to each i-mode terminal 8 for managing billing information. It is not desirable that the telephone number specific to an i-mode terminal 8 circulate in the open environment of Internet 1. Accordingly, the carrier generates a terminal ID unique to the telephone number to identify the i-mode terminal 8. The correspondence table of the terminal ID and the telephone number is managed by the carrier. By converting or encrypting the correspondence as needed, information enabling the terminal to be identified can be fed onto the Internet 1 without disclosing the telephone number.

The i-mode terminal 8 is a telephone or data communication terminal. Description is concentrated here on the data communication function, particularly the service for providing Web contents on the Internet. The i-mode terminal 8 is identified by a telephone number, but it is identified by a terminal ID on the Internet 1 as described above. The browser installed on the i-mode terminal 8 has a function of displaying compact HTML. Accordingly, on a website for i-mode terminals, contents are created based on compact HTML, as described later.

A service request from the i-mode terminal 8 to the i-mode Web server 3 on the Internet 1 is transferred as an ALP? request on the packet communication network 6, and converted by the gateway 2 to an HTTP request for Internet 1. In the HTTP request, the URL of the i-mode Web server is specified, and the request is sent to the server specified by the URL.

Gateway 2 appends a terminal ID to the request from the i-mode terminal 8. The terminal ID allows the i-mode Web server 3 to identify the user, perform a billing, and customize services according to the user. For instance, if there is registration data or user information that has already been given to the Web server 3, it can provide service taking into account the user convenience, such as providing service without requiring user information to be input again. Accordingly, in the i-mode Web server 3, the contents or system is usually constructed on the assumption that the terminal ID exists. However, the terminal ID is not essential for providing service. Service can be provided even if the existence of the terminal ID is not assumed, and the present invention is not applied to a Web server that is not based on such terminal ID. But, if the terminal ID is used in part of service, the present invention is applied.

The i-mode website 3 is a contents service system intended for the access from the i-mode terminal 8 as described above. The contents are created for i-mode terminals in compliance with compact HTML. The i-mode Web server 3 sends back the contents according to a request from the i-mode terminal 8. However, if the existence of terminal ID is assumed as described above, it does not respond or can only partially respond when it receives a request containing no terminal ID. All the services are provided by obtaining the terminal ID. Since the terminal ID is given and managed by the carrier, the terminal ID is generally sent back only to a website approved by the carrier. However, if the present invention is applied, such characteristic of the terminal ID is not necessary. In addition the terminal ID is formed of numerals or characters of 12 digits, for instance, "AAABBBCCCDDD."

The content, which is a response to the request, is sent to the i-mode terminal 8 through the Internet 1, gateway 2, and packet communication network 6. The i-mode terminal 8 displays the content by the installed browser to make it available for use by the user.

The use of the i-mode Web server 3 from the i-mode terminal 8 can be realized as described above. Now, description is made to the use of the service by the i-mode Web server 3 from the personal computers 5 and 9. The personal computer is given here by way of example as the sender of a service request, but this is no limitation. As a matter of course, the sender may be other information processing equipment such as a PDA (Personal Digital Assistants) having no terminal ID, mainframe computer, or workstation.

The personal computers 5 and 9 are computer systems, which access the i-mode Web server 3 by using a common browser (for instance, Internet Explorer (trademark)) running on the systems, as described later. The personal computer 5 is identified, for instance, by an IP address and connected to the Internet 1. Alternatively, the personal computer 5 may be connected to the Internet 1 through an ISP (Internet Service Provider). On the other hand, a plurality of personal computers 9 is connected on a LAN, and connected to the Internet 1 via the proxy server 4.

The proxy server 4 has not only the common proxy server function, but also a simulation function of relating the generation of terminal ID and the cookie of the personal computer 5 or 9, which is a characteristic feature of the present invention.

FIG. 2 is a block diagram showing the relation among the personal computer 9, proxy server (simulation server) 4, and i-mode Web server 3. The personal computer 9 issues a request (1), which is received by the simulation server 4. Upon receipt of the request (1) from a computer 5 or 9, the simulation server generates or selects a terminal ID (termID). And, the simulation server 4 sends a request (2) with a terminal ID to the i-mode server 3. In the i-mode server 3, a processing according to the request is carried out. A terminal ID is appended to the request, and thus, for the i-mode server 3, it is not different from a request from the i-mode terminal 8; the whole service is provided in the same way as requests from the i-mode terminal 8. That is, the request from the personal computer through the proxy server 4 is simulated as if it is a request from the i-mode terminal 8. The result of service is sent back to the simulation server 4 as a response (3), which the simulation server 4 transfers to the personal computer 9, the sender of the request.

The generation or selection of a terminal ID is performed by referring to a hash table 10 provided in the simulation server 4. The hash table 10 can be physically stored, for instance, in the memory area of the simulation server 4 or in the external storage area such as a hard disk drive, it need not be stored in the same computer system as the simulation server 4, provided that its location can be identified by an identifying means such as URL or IP address.

In the hash table 10, the cookie and the terminal ID are stored so that they are related to each other. The cookie is generated for each personal computer 5 or 9, or each session in the personal computer 5 or 9 which issued the request, and uniquely related to the personal computer 5 or 9 or the session. On the other hand, the terminal ID is uniquely related to the cookie by the hash table 10, and as a result, the personal computer 5 or 9 or its session is uniquely related to the terminal ID. That is, for the communication between the personal computer 5 or 9 and the i-mode server 3 through the simulation server 4, the cookie can be used as an identifier for controlling the session. This allows the access from a personal computer having no terminal ID to the i-mode server 3, thereby to receive the service for the i mode. Further, since the full access from a personal computer to the i-mode server is allowed, it is possible to perform any test such as a bulk stress test by using a general-purpose test tool running on the personal computer.

In the above system, conventional computer systems can be used as the gateway 2, servers 3 and 4, and personal computers 5 and 9. For instance, a computer system can be used, which has a central processing unit (CPU), a main memory (RAM), and a nonvolatile memory (ROM) which are connected to each other by a bus. To the bus, a coprocessor, image accelerator, cache memory, input/output control device (I/O), and other devices may be connected. To the bus, an external storage device, data input device, display device, communication controller, and other devices are connected through an appropriate interface. Further, it is needless to say that hardware resources provided in a conventional computer system can be provided. A hard disk drive can be representatively given as the external storage device by way of example, but this is no limitation, and semiconductor memories such as magneto optical memory, optical memory, flash memory are also included. As the data input device, an input device such as a keyboard and a pointing device such as mouse can be provided. The data input device also includes an image reader such as a scanner, and a voice input unit. As the display device, a CRT, liquid crystal display, and plasma display can be given by way of example. Further, the computer system includes various kinds of computers such as a personal computer, workstation, and mainframe computer.

The communication method using the above described system is described below. FIG. 3 is a flowchart explaining an example of the method for communication between computer systems, which is an embodiment of the present invention. In FIG. 3, the processing in the personal computer 5 or 9 (PC client) is shown in the left part, the processing in the proxy server 4 (simulation server) is shown in the central part, and the processing in the i-mode Web server 3 (i-mode server) is shown in the right part.

First, at the beginning of processing, the network path is checked (step 20) and the proxy server is set (step 21) on the PC client side. Thereafter, the PC client 5 or 9 issues a request (step 22), and if it has a cookie, the cookie is sent at step 23.

In the proxy server 4, initialization is performed at the beginning of the processing (step 24). FIG. 4 is a flowchart showing an example of the initialization of the proxy server.

The server is started at the beginning of the processing (step 50), and the initial parameters are obtained from a initialization file 52 that is stored in a predetermined storage area. The initial parameters are, for instance, the number of allowed users and the terminal ID space. The number of allowed users is the number of users which can be treated in the proxy server 4. The terminal ID space contains a set of terminal ID's. Many terminal ID's exceeding the number of allowed users are generated and prepared for later use. The terminal ID's are generated so that they do not overlap with each other or with terminal Ids assigned by the carrier. The generation of many terminal ID's during initialization of the simulation server eliminates the possibility of generating overlapping terminal ID's during the operation of the server, and the terminal ID's assigned by the carrier can be avoided to prevent the overlapping with the terminal ID's when an access is made through the gateway 2 of the carrier. The terminal ID's generated here are generated in the form suitable for the format of the terminal ID's given in the gateway 2. For the i-mode, it is numerals or characters of 12 digits in the form of "AAABBBCCCDDD."

Then, a virtual ID space for the number of users is prepared (step 53). The virtual ID space is performed by recording (determining) an available terminal ID space in the memory of the server (step 54). For instance, if the number of users which can be simultaneously handled by the server is 1000, terminal ID's for 1000 users are extracted from the terminal ID space generated in step 51 as the initial parameter and recorded on the memory.

Then, the space required for a corresponding cookie is determined for each terminal ID (step 55). The determined cookie space is kept on the memory of the server as a storage area (step 56).

Then, a pointer is initialized to point to a next available address for a cookie (step 57). The address setting is initialized by storing the memory address of the cookie space kept in step 55 in a register functioning as a pointer (step 58).

Next, the area for the hash table 10 of FIG. 2 showing the correspondences between terminal ID's and cookies is kept on the memory (step 59). The initialization process then terminates (step 60).

Referring again to FIG. 3, when a request and a cookie are received by the proxy server 4 at steps 25 and 26, the proxy server 4 determines whether the cookie was issued by itself (step 27). Whether the cookie was issued by itself can be determined by whether the corresponding cookie is recorded in the hash table.

Since there is no cookie recorded just after the starting of the process, the determination in step 27 becomes "false (no)," and the process goes to step 28. In this case, in step 28, it is determined that the connection from the sender PC of the current request is a new connection (step 28), and the pointer to the next available cookie is obtained (step 29). As to the pointer, a pointer area was kept on the memory in the above initialization process, and the pointer value can be obtained by obtaining a value stored in the memory. The pointer just after the starting of the process indicates the leading cookie space. The pointer value is the address of the memory area in which the cookie is stored, as described above, and terminal ID's are related to the cookie space (area) as described in the initialization process. However, the terminal ID's after the pointer have not been used yet.

Then, from the pointer value, the corresponding terminal ID is obtained (step 30). This terminal ID is used in the current request and the succeeding session.

Then, the server generates a cookie according to a predetermined generation rule (step 31). For instance, the terminal ID and access time can be included. Since access is not simultaneously made from the same computer system 5 or 9, an access record can be uniquely generated by storing both the access time and the terminal ID in the cookie.

Then, the generated cookie and terminal ID are written to a predetermined area of the hash table (step 32). This has uniquely related the cookie and the terminal ID. This correlation is kept while the session continues. The session is, for instance, from the starting to the termination of the browser. A plurality of requests may occur in a single session, and in this case, the same terminal ID is used for all requests.

Then, the pointer to the next available cookie is incremented by one (step 33). This is to prepare for the generation of a terminal ID for the next new connection.

Then, the generated terminal ID is appended to the request (step 34), and the request with the terminal ID is sent to the i-mode server 3 (step 35). Further, the generated cookie may be sent to the personal computer 5 or 9, and stored in a predetermined memory area in each PC.

On the other hand, if the determination in step 27 is "true (yes)," it is determined to be a connection from an existing PC (step 36). In this case, a cookie must have already been generated, and a terminal ID is retrieved from the cookie. The terminal ID is appended to the request (step 37). As to the cookie to be referenced, if a cookie was already sent to the personal computer from the proxy server 4, and sent to the server along with the current request, then this received cookie will be used. If no cookie is sent along with the request, the cookie stored in the hash table can be referred to.

The request with the terminal ID is sent to the i-mode server 3 (step 38). In the i-mode server 3, the request with the terminal ID is received (step 39), and after executing a predetermined application or service (step 40), a response is sent (step 41). In the i-mode server, the request with the terminal ID is received, so full service is provided as for a request from an i-mode terminal 8. That is, by using the method of this embodiment, all the service available in the i-mode server can be received even for a service request from the personal computer.

The response from the i-mode server 3 is transferred through the proxy server 4 (step 42), and received at the personal computer 5 or 9 (step 43). In the personal computer 5 or 9, the received response, described in compact HTML for example, is browsed and displayed (step 44).

If another request is issued in the same session (until the browser is closed), "yes" is determined in the above step 27, and using the terminal ID already given to the session, the request is sent to the i-mode Web site as described above. At the end of the session, the cookie stored in the personal computer is erased. If a request is issued in a new session, a new terminal ID is given. In the example described here, the cookie is erased at the end of the session, but alternatively the cookie may be reserved for a long period of time. In this case, since the same terminal ID is used before and after the session terminates, it is needed to store the identity of the personal computer in the cookie. For instance, the IP address of the personal computer can be used as the identifier.

As described above, by using the communication method of this embodiment, access to the i-mode Web server 3 is enabled from a personal computer having no terminal ID. This allows the user to access the same i-mode Web server from an i-mode terminal or a personal computer, so the user can enjoy the merits of both the real time characteristic and mobility of the mobile terminal and the usability of the personal computer. Further, the operator of an i-mode Web server can also provide the contents for i-mode to personal computer users without modifying the system. Furthermore, as described below, a personal computer can measure the performance of an i-mode Web server by the use of a general-purpose test tool. By using a general-purpose test tool, a proper bulk stress verification can be performed, and in addition, a performance check can be made, as needed, even in the course of developing a system, and the construction, verification, and test of the system can be automated to increase the system development efficiency.

The following description is directed to one example in which a bulk stress test of an i-mode Web site is performed using the system described in the embodiment 1. FIG. 5 is a flowchart showing an example of the method for measuring the performance of a computer system, which is another embodiment of the present invention. In FIG. 5, the processing in the personal computer 5 or 9 (test tool PC) is shown in the left part, the processing in the proxy server 4 (simulation server) is shown in the central part, and the processing in the i-mode Web server 3 (i-mode server) is shown in the right part, as in FIG. 3.

The checking of the network path in the test tool PC after beginning the process (step 20), the setting of the proxy server (step 21), and the execution of the initialization process in the simulation server (step 24) are similar to the Embodiment 1. In the test tool PC (personal computer 5, 9), a general-purpose test tool is started after step 21 (step 70). Thereafter, an access try is performed under the control of the test tool (step 71). The access demand (request) is sent to the simulation server 4, which receives it at step 72. Then, the simulation process described in the Embodiment 1, of generating a terminal ID and a cookie and relating them, is carried out (step 73). The terminal ID is appended to the request, which is sent to the i-mode server 3, as in the Embodiment 1, and the i-mode server 3 receives it (step 39). In the i-mode server 3, an application processing or service processing of the object to be tested is carried out (step 40), and a response is sent (step 41).

The sent response is transferred through the simulation server (step 42), and the receiving test tool PC records the response (step 75). And, the test tool repeats the predetermined access try, and thereafter it verifies the response result (step 76).

The series of processing is performed in parallel by the test tool installed on one PC. The number of sessions processed in parallel depends on the number of licenses of the test tool. That is, since the Internet and LAN are broadband communication means, the number of them can be increased to the extent that the simultaneous processing of many users (sessions) is bottlenecked by the communication speed. Further, if a plurality of personal computers is used to ensure a plurality of access paths, simulation can be performed on a condition where an enormous number of users simultaneously access the i-mode server 3. That is, the verification of response in such condition is a bulk stress test. In this embodiment, such bulk stress test can easily be made. In addition, since a general-purpose test tool is used, the test is automated, and various performance measuring tools may also be used. As a result, the performance verification process for an i-mode server can be simplified, and the system development efficiency can be increased. Further, in the conventional verification in which access is made by actually using i-mode terminals, only one access can be realized by one mobile phone, so it was impossible to implement a considerable number of bulk stresses. In the verification method of this embodiment, a general-purpose test tool can be used, so a considerable number of bulk stresses can simply be simulated.

Although the invention made by the present inventor has been specifically described according to the embodiments of the invention, the present invention is not limited to the above embodiments, but it may be variously modified without departing from its spirit.

For instance, NTT Docomo has been shown as the carrier and the i-mode terminal has been shown as the mobile phone terminal in the above embodiments by way of example, but this is no limitation. For instance, the present invention can also apply to J-sky of the J-phone group and EZweb of the DDI group.

Further, as shown in FIG. 6, a plurality of Internet services by mobile phone systems assigned terminal ID's may exist. In a first mobile phone system 2, 6, 7, 8 and a second mobile phone system 10, 11, 12, 13, the formats of terminal ID's used may be different from each other. For instance, one could b 12 digits and the other 13 digits. In such a case, the simulation server 4 can determine for which mobile phone service the Web site is intended, and select a terminal ID format as needed.

Further, the mobile phone service has been shown by way of example as a service in which a request with a terminal ID is issued, but this is no limitation. The present invention can apply to the simulation of a system in which service is provided by appending unique identifier information corresponding to terminal ID.

What is claimed:

1. A network system comprising:
   terminals identified with an inherent terminal identifier;
   a communication network for communicating voice, data, and other information among said terminals;
   a gateway for connecting said communication network to a computer network, and appending said inherent terminal identifier to a first request for service;
   a first computer system connected to said computer network, for referring to said inherent terminal identifier to provide the service in response to said first request;
   a second computer system connected to said computer network;
   a third computer system connected to said first computer system through said second computer system, wherein said second computer system includes: a unit for generating a second terminal identifier suitable for the format of said inherent terminal identifier;
   a unit for generating a session control identifier related to said third computer system;
   a unit for relating said second terminal identifier to said session control identifier; and
   a unit responsive to a second request from said third computer system for appending said second terminal identifier to said second request, and sending said second request to said first computer system.

2. The computer network system according to claim 1, wherein said terminals are mobile phones;
   said third computer system is a personal computer system; and
   said session control identifier is information recorded in the cookie of said third computer system.

3. The computer network system according to claim 1 or 2, wherein said second terminal identifier and said session control identifier are uniquely and statically related during a communication session between said first computer system and said third computer system.

4. A computer system enabled to access a first computer system that is capable of receiving a first request accompanied by an inherent terminal identifier, and referring to said inherent terminal identifier to respond to said request, said computer system comprising:
   a unit for generating a second terminal identifier suitable for the format of said inherent terminal identifier;
   a unit for generating a session control identifier related to a third computer system having no said inherent terminal identifier;
   a unit for relating said second terminal identifier and said session control identifier; and
   a unit responsive to a second request from said third computer system for appending said second terminal identifier to said second request, and sending said second request to said first computer system, wherein said inherent terminal identifier and said second terminal identifier suitable for a service site for mobile phone terminals and said third computer system different than a mobile phone terminal.

5. The computer system according to claim 4, wherein said third computer system is a personal computer system, and said session control identifier is information recorded in the cookie of said third computer system.

6. The computer system according to claim 5, further comprising:
   a unit for pre-generating a plurality of said second terminal identifiers;
   a unit responsive to an access from said third computer system for obtaining the information in the cookie from said third computer system, and determining whether said cookie has been issued by said third computer system;
   a unit for selecting one of the plurality of said second terminal identifiers if said determination is "false," and generating a cookie including said selected second terminal identifier;
   a unit for relating said selected second terminal identifier and said cookie, and storing them; and
   a unit for appending said second terminal identifier to said request, and sending said request to said first computer system.

7. The computer system according to claim 6, comprising: a unit for referring to the information on the cookie to obtain said second terminal identifier contained in said cookie if said determination is "true"; and a unit for appending said second terminal identifier to said request, and sending said request to said first computer system.

8. The computer system according to claim 6, wherein said cookie is further appended to said second request.

9. The computer system according to any of claims 4–8, wherein said second terminal identifier and said session control identifier are uniquely and statically related during the communication session between said first computer system and third computer system.

10. A method for communication between a first computer system and a third computer system connected to said first computer system through a second computer system, said first computer system being capable of receiving a first request accompanied by an inherent terminal identifier, and referring to said inherent terminal identifier to respond to said first request, said method comprising the steps of:

generating a second terminal identifier suitable for the format of said inherent terminal identifier;

generating a session control identifier related to said third computer system having no said inherent terminal identifier;

relating said second terminal identifier and said session control identifier; and responding to a second request from said third computer system for appending said second terminal identifier to said second request, and sending said second request to said first computer system, wherein said inherent terminal identifier and said second terminal identifier suitable for a service site for mobile phone terminals and said third computer system different than a mobile phone terminal.

11. A method for communication according to claim 10, wherein said third computer system is a personal computer system, said method further comprising a step of recording said session control identifier in the cookie of said third computer system.

12. A method for communication according to claim 11, comprising the steps of:

generating a plurality of said second terminal identifiers;

responding to an access from said third computer system to obtain the information in the cookie from said third computer system; determining whether said cookie has been issued by said second computer system;

selecting, if said determination is "false," one second terminal identifier from said plurality of said second terminal identifiers, and generating a cookie containing said selected second terminal identifier;

relating said selected second terminal identifier and the information in said cookie, and storing them; and appending said second terminal identifier to said second request, and sending said second request to said first computer system.

13. A method for communication according to claim 12, comprising the steps of:

referring to said cookie to obtain the second terminal identifier contained in said cookie, if said determination is "true"; and appending said second terminal identifier to said request, and sending said second request to said first computer system.

14. A method for communication according to claim 12, wherein said cookie is further appended to said second request.

15. A method for communication according to any of claims 10–14, wherein said second terminal identifier and said session control identifier are uniquely and statically related during the communication session between said first computer system and said third computer system.

16. A method for measuring the performance of a first computer system capable of receiving a first request accompanied by an inherent terminal identifier, and referring to said inherent terminal identifier to respond to said first request, in which a general-purpose Web test tool is installed in a third computer system connected to said first computer system through a second computer system, said method comprising the steps of:

generating a second terminal identifier suitable for the format of said inherent terminal identifier;

generating a related session control identifier for each user of said Web test tool;

relating said second terminal identifier and said session control identifier; and responding to a request from each user for appending said second terminal identifier to said second request, and sending said second request to said first computer system, wherein said inherent terminal identifier and said second terminal identifier suitable for a service site for mobile phone terminals and said third computer system different than a mobile phone terminal.

17. The method for measuring performance according to claim 16, further comprising a step of recording said session control identifier in said cookie for each user, wherein said session control identifier and said second terminal identifier are uniquely and statically related during the communication session between said user and said first computer system.

18. In a storage medium on which a computer-readable program is stored for enabling a computer to implement communication between a first computer system and a third computer system connected to said first computer system through a second computer system, said first computer system being capable of receiving a first request accompanied by an inherent terminal identifier, and referring to said inherent terminal identifier to respond to said first request, a storage medium having stored thereon a program for enabling a computer to implement the functions of:

generating a second terminal identifier suitable for the format of said inherent terminal identifier;

generating a session control identifier related to the third computer system having no said inherent terminal identifier;

relating said second terminal identifier and said session control identifier; and responding to a second request from said third computer system for appending said second terminal identifier to said request, and sending said request to said first computer system, wherein said inherent terminal identifier and said second terminal identifier suitable for a service site for mobile phone terminals and said third computer system different than a mobile phone terminal.

* * * * *